US009935992B2

(12) United States Patent
Rajagopal et al.

(10) Patent No.: US 9,935,992 B2
(45) Date of Patent: Apr. 3, 2018

(54) METHOD AND SYSTEM FOR GENERATING PERSONALIZED VIEWS OF LIVE VIDEO FEEDS

(71) Applicant: Wipro Limited, Bangalore (IN)

(72) Inventors: Harish Nair Rajagopal, Trivandrum (IN); Abul Koyes Choudhury, Bangalore (IN); Sreeprakash Thonikkandy, Wayanad (IN)

(73) Assignee: WIPRO LIMITED, Bangalore (IN)

( * ) Notice: Subject to any disclaimer, the term of this patent is extended or adjusted under 35 U.S.C. 154(b) by 266 days.

(21) Appl. No.: 15/085,176

(22) Filed: Mar. 30, 2016

(65) Prior Publication Data
US 2017/0289232 A1    Oct. 5, 2017

(30) Foreign Application Priority Data

Mar. 29, 2016   (IN) .............................. 201641010847

(51) Int. Cl.
| | |
|---|---|
| G06F 15/16 | (2006.01) |
| H04L 29/06 | (2006.01) |
| H04L 29/08 | (2006.01) |
| H04N 21/258 | (2011.01) |
| H04N 21/45 | (2011.01) |
| H04N 21/218 | (2011.01) |

(Continued)

(52) U.S. Cl.
CPC ............ *H04L 65/605* (2013.01); *H04L 67/10* (2013.01); *H04L 67/306* (2013.01); *H04N 21/2187* (2013.01); *H04N 21/21805* (2013.01); *H04N 21/25841* (2013.01); *H04N 21/2668* (2013.01); *H04N 21/4532* (2013.01)

(58) Field of Classification Search
CPC ..... H04L 65/605; H04L 67/10; H04L 67/306; H04L 21/4532; H04L 21/25841
USPC ......................................... 709/219, 200, 231
See application file for complete search history.

(56) References Cited

U.S. PATENT DOCUMENTS

| | | | |
|---|---|---|---|
| 6,564,380 B1 * | 5/2003 | Murphy ................. | H04N 5/232 348/207.11 |
| 2003/0030651 A1 | 2/2003 | Gibbs et al. | |

(Continued)

OTHER PUBLICATIONS

C.Z. Patrikakis et al., "Personalized Coverage of Large Athletic Events", IEEE Computer Society pp. 18-29 (2011).

(Continued)

*Primary Examiner* — El Hadji Sall
(74) *Attorney, Agent, or Firm* — Finnegan, Henderson, Farabow, Garrett & Dunner LLP (57) ABSTRACT

The present disclosure discloses a method and a system for generating personalized views of live video feeds of an event. The method comprises determining one or more personalized inputs associated with each user. Further, the method comprises receiving a live video feed of an event from each of a plurality of imaging units. Then, the method generates a map of an area within which the event occurs. The method further comprises, receiving real-time location of at least one subject participating in the event from a tracking unit, correlating the real-time location of the subject with the mapped area, selecting, for each user, at least one video feed among the live video feeds for generating personalized views of the live video feeds and transmitting the at least one selected video feed to respective users through a web server for providing personalized views of the live video feeds of the event.

17 Claims, 5 Drawing Sheets

(51) Int. Cl.
*H04N 21/2187* (2011.01)
*H04N 21/2668* (2011.01)

(56) References Cited

U.S. PATENT DOCUMENTS

2013/0132836 A1 5/2013 Ortiz
2015/0381938 A1* 12/2015 Cunico .................. H04N 7/157
348/14.1
2016/0328843 A1* 11/2016 Graham .................. G06T 15/00

OTHER PUBLICATIONS

European Search Report dated Feb. 3, 2017 in counterpart European Patent Application No. 16181118.7, 8 pages.

* cited by examiner

METHOD AND SYSTEM FOR GENERATING PERSONALIZED VIEWS OF LIVE VIDEO FEEDS

TECHNICAL FIELD

The present disclosure relates to a field of streaming of live video feeds. More specifically but not exclusively, the present disclosure relates to a method and a system for generating personalized views of live video feeds of an event, for broadcasting.

BACKGROUND

Streaming of live video feeds of events is very popular in current scenario due to advancements in networking and digitization of data. Numerous cameras are used to provide users better clarity and different views of an event. For example, in a live sports event, users will have affiliation to particular team, players, view, incidents, etc. Although, the present systems provide information about individual players, teams and better views of important incidents of an event, options from user perspective are not covered by the systems broadcasting the event. Users may require live video feeds focussing a particular player of choice, particular view, particular incident of the event etc. In absence of the said features, users may lack interest to watch the event. The present systems do not consider user preferences for streaming the live video feeds. Modern technology in the field of image processing has enabled broadcasting of the events with different views, but such streaming results in additional time delays due to complex computation and post processing of the live video feeds. Also, image processing systems may fail to identify subjects at long distances. Further, large computing infrastructure may be in need to perform fast and accurate image processing. Thus, such systems may incur additional costs and also does not provide users personalized benefits.

SUMMARY

In an embodiment, the present disclosure relates to method for generating personalized views of live video feeds of an event, comprising determining, by a view generator, one or more personalized inputs associated with each user based on user data, receiving a live video feed of an event from each of a plurality of imaging units associated with the view generator, where each of the plurality of imaging units focuses a view zone, generating a map of an area within which the event occurs, receiving real-time location of at least one subject participating in the event from a tracking unit associated with the view generator, correlating the real-time location of the subject with the mapped area, selecting for each user, at least one video feed among the live video feeds based on the correlation and at least one of one or more predefined parameters, one or more personalized inputs and specification of each of the plurality of imaging unit and transmitting the at least one selected video feed to respective users through a web server, for providing personalized views of live video feeds of the event.

In an embodiment, the present disclosure presents a view generator for generating personalized views of live video feeds of an event. The view generator comprises a processor and a memory. The memory stores processor executable instructions, which, on execution causes the processor to determine one or more personalized inputs associated with each user based on user data, receive a live video feed of an event from each of a plurality of imaging units associated with the view generator, where each of the plurality of imaging units focuses a view zone, generate a map of an area within which the event occurs, receive real-time location of at least one subject participating in the event from a tracking unit associated with the view generator, correlate the real-time location of the subject with the mapped area, select for each user, at least one video feed among the live video feeds based on the correlation and at least one of one or more predefined parameters, one or more personalized inputs and specification of each of the plurality of imaging unit and transmit the at least one selected video feed to respective users for providing personalized views of the live video feeds of the event.

In one embodiment, the present disclosure discloses a non-transitory computer readable medium including instructions stored thereon that when processed by at least one processor cause a device to perform operations comprising determining one or more personalized inputs associated with each user based on user data, receiving a live video feed of an event from each of a plurality of imaging units associated with the view generator, where each of the plurality of imaging units focuses a view zone, generating a map of an area within which the event occurs, receiving real-time location of at least one subject participating in the event from a tracking unit associated with the view generator, correlating the real-time location of the subject with the mapped area, selecting for each user, at least one video feed among the live video feeds based on the correlation and at least one of one or more predefined parameters, one or more personalized inputs and specification of each of the plurality of imaging unit and transmitting the at least one selected video feed to respective users for providing personalized views of the live video feed of the event.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for generating personalized view of live video feeds of an event. The system comprises a view generator to generate personalized views of live video feeds of an event. The view generator determines personalized inputs associated with each user. Further, the view generator receives live video feeds from imaging units associated with the view generator. Based on the personalized inputs, the view generator receives real-time location of at least one subject from a tracking unit associated with the view generator. Further, a correlation is derived between a map of an area and the location of the at least one subject. Then, the view generator selects at least one live video feeds based on the one or more personalized inputs and transmits the at least one selected video. Thus the live video feeds are transmitted to respective users, thereby providing personalized views for each user.

Figure 1:
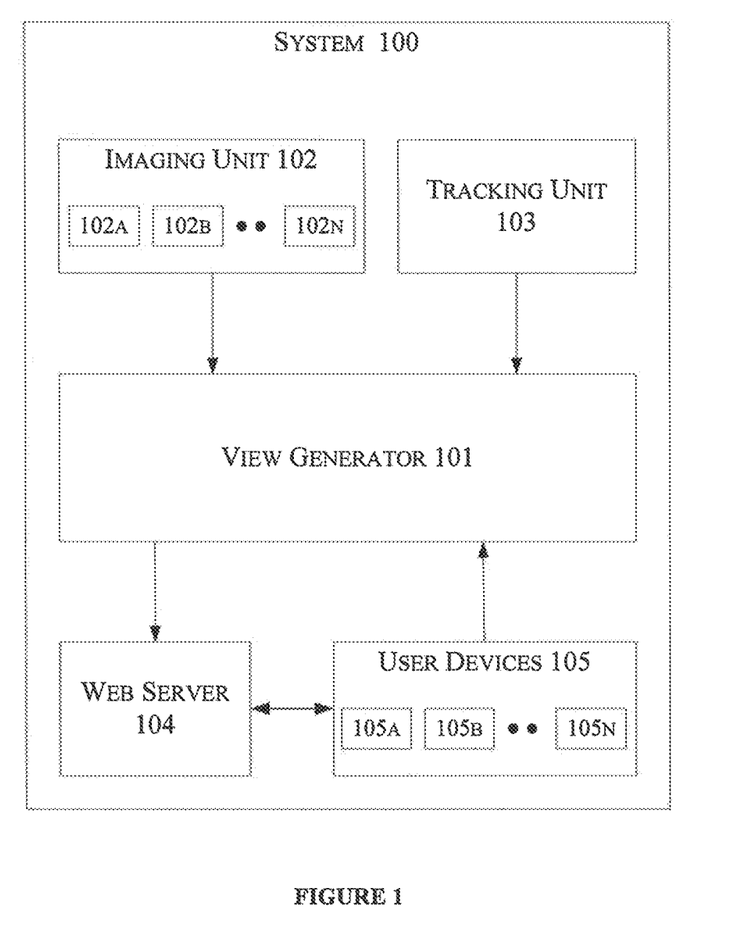
FIG. 1 of the present disclosure illustrates a system for generating personalized views of live video feeds of an event with some embodiments of the present disclosure.

FIG. 1 of the present disclosure illustrates a system 100 for generating personalized views of live video feeds of an event. As shown in FIG. 1, the system 100 comprises a view generator 101, imaging unit 102A, imaging unit 102B, . . . , imaging unit 102N, tracking unit 103, a web server 104, user device 105A, user device 105B, . . . , and user device 105N. The imaging unit 102A, imaging unit 102B, . . . , imaging unit 102N can be represented as plurality of imaging units 102 henceforth in the present disclosure. User device 105A, user device 105B, . . . , user device 105N can be represented as one or more user devices 105 henceforth in the present disclosure. The view generator 101 determines one or more personalized inputs associated with each user. Further, the view generator 101 receives a live video feed from each of plurality of imaging units 102. Here, each of the plurality of imaging units 102 also provides specification for identifying the areas covered by the plurality of imaging units 102. Then, the view generator 101 generates a map of the area based on the view zone focussed by each of the plurality of imaging units 102. Here, the map of the area indicates boundary in which the event takes place. Further, the view generator 101 receives real-time location of at least one subject from a tracking unit 103 associated with the view generator 101. The tracking unit 103 determines real-time location of each of one or more subjects participating in the event. The view generator 101 receives real-time location of at least one subject based on the one or more personalized user inputs. Furthermore, the view generator 101 correlates the mapped area with the real-time location of the at least one subject. The correlation indicates the presence of the at least one subject in the mapped area. Then, the view generator 101 selects at least one video feed among the live video feeds for each user. The at least one selected video feed is then transmitted to a web server 104 for transmitting to respective user among each users.

In an embodiment, the view generator 101 can determine the one or more personalized inputs based on user data. The user data may include historical viewing pattern of each user, information based on the social feed of the user, etc. In an alternate embodiment, the view generator 101 may receive the one or more personalized inputs from each user directly. Here, each user may provide the one or more personalized inputs through one or more user devices 105.

In an embodiment, the view generator 101 may receive the live video feed from the plurality of imaging units 102 through a wired interface or a wireless interface. In one embodiment, the view generator 101 receives specification of each of the plurality of imaging units 102. The specification may include, but are not limited to, lens optics data, shutter speed, zoom and identity number of the plurality of imaging units.

In an embodiment, the web server 104 may be connected to the view generator 101 by means of at least one of wired interface and wireless interface. In an embodiment, the view generator 101 configures the web server 104 to stream the selected at least one video to each user respectively.

In an embodiment, the one or more personalized inputs are received by the view generator 101 though one or more user devices 105. The one or more user devices may be, but are not limited to, Personal Digital Assistant, mobile phone, laptop, netbook, desktop, or any type of other computing devices.

Figure 2:
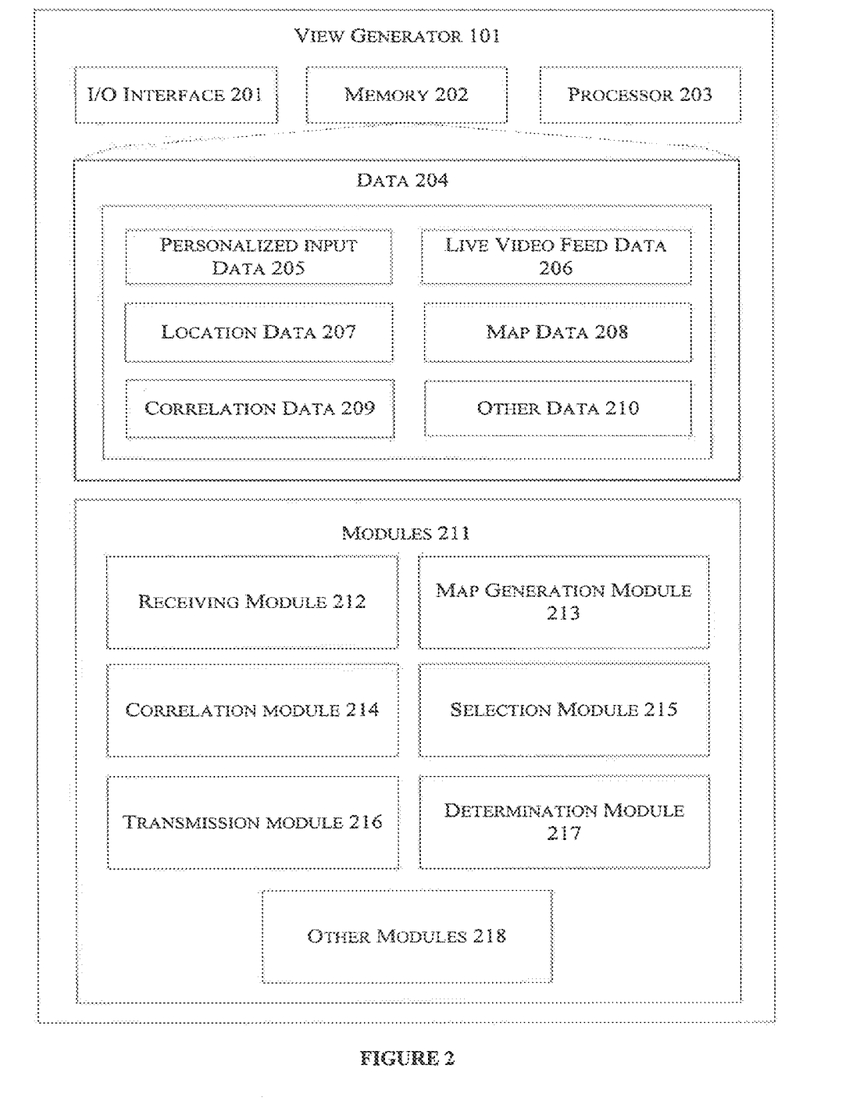
FIG. 2 shows an exemplary block diagram illustrating internal architecture of a view generator for generating personalized views of live video feeds of an event with some embodiments of the present disclosure.

FIG. 2 shows an exemplary block diagram of internal architecture the view generator 101 for generating personalized views of live video feeds of an event in accordance with some embodiments of the present disclosure.

The view generator 101 may include at least one central processing unit ("CPU" or "processor") 203 and a memory 202 storing instructions executable by the at least one processor 203. The processor 203 may comprise at least one data processor for executing program components for executing user or system-generated requests. A user may include a person, a person using a device such as those included in this disclosure, or such a device itself. The memory 202 is communicatively coupled to the processor 203. In an embodiment, the memory 202 stores one or more data 204. The view generator 101 further comprises an Input/Output (I/O) interface 201. The I/O interface 201 is coupled with the processor 203 through which an input signal or/and an output signal is communicated.

In an embodiment, one or more data 204 may be stored within the memory 202. The one or more data 204 may include, for example, personalized user input data 205, live video feed data 206, location data 207, map data 208, correlation data 209, and other data 210. The personalized user input data 205 may include at least one subject, predefined viewing angles of the event, group affiliation and importance of an incident of the event. The live video feed data 206 comprises plurality of live video feeds of the event captured by each of the plurality of imaging units 102. The location data 207 comprises real-time co-ordinates of the at least one subject. In an embodiment, the view generator 101 receives location data 207 of the at least one subject at regular intervals or when the at least one subject moves with respect to a reference frame. Here, the reference frame may be a set of stationary points identified and fixed prior to the commencement of the event. In an embodiment, the map data 208 comprises co-ordinates of the area determined from the view zone focussed by each of the plurality of imaging units 102. For example, in a sport like soccer, the playing area (rectangular boundary) is determined from the plurality of imaging units 102 configured by the view generator 101, which focus view zones of the playing area. The correlation data 209 includes a co-ordinates corresponding to the real-time location of the at least one subject with respect to the mapped area. Here, the co-ordinates indicates presence of the at least one subject in the mapped area.

The other data 210 may be used to store data, including temporary data and temporary files, generated by modules 211 for performing various functions of the view generator 101.

In an embodiment, the one or more data 204 in the memory 202 is processed by modules 211 of the view generator 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the modules 211 may include, for example, receiving module 212, map generation module 213, correlation module 214, selection module 215, transmission module 216, determination module 217 and other modules 218. It will be appreciated that such aforementioned modules 210 may be represented as a single module or a combination of different modules.

In an embodiment, the determination module 217 may determine the one or more personalized inputs associated with each user. The one or more personalized inputs are determined based on manual settings specified by the user or identified based on historical viewing pattern of each user, or social media feed of the user. Here, the one or more personalized user inputs may include the at least one subject, predefined viewing angles of the event and importance of an incident of the event.

In an embodiment, the receiving module 212 receives a live video feed data 206 from each of the plurality of imaging units 102 associated with the view generator 101. Each of the plurality imaging units 102 is configured to focus a view zone to capture live video feed data 206 of the event occurring in the view zone. Here, each of the plurality of imaging units 102 capture a live video feed data 206 of the event occurring in the view zone, from its viewpoints. The live video feed data 206 captured from the viewpoints is received by the view generator 101 to provide each user respective personalized views of the live video feed data 206. Furthermore, the view generator 102 receives real-time location data 207 of at least one subject from a tracking unit 103 associated with the view generator 101.

In an embodiment, the receiving module 212 may receive personalized inputs from each user from one or more user devices 105. The personalized inputs are received from the I/O Interface 201 of the view generator 101. In one implementation, the tracking unit 103 tracks location of each of the one or more subjects participating in the event. The receiving module 212 receives real-time location data 207 of the at least one subject based on the one or more personalized inputs.

In one embodiment, the map generation module 213 generates a map of an area within which the event occurs. Here, the map generation module 213 receives the live video feed data 206 of the event captured from predefined viewpoints from the receiving module 212. Then, the map generation module 213 determines a boundary of the area within which the event occurs based on the predefined viewpoints. The map comprises co-ordinates of the area within which the event occurs. In an embodiment, a predefined location in the mapped area can be considered as a set of stationary points of reference.

In an embodiment, the correlation module 214 receives the location data 207 from the receiving module 212 and map data from the map generation module 213. The correlation module 214 correlates the map data 208 with the location data 207 to determine presence of the at least one subject in the mapped area. The correlation data 209 comprises co-ordinates of the least one subject with respect to the set of stationary points of reference.

In one embodiment, the tracking unit 103 uses Global Positioning System (GPS) to track each of the one or more subjects. Here, the co-ordinates of each of the one or more subjects are determined with respect to a reference system. In one implementation geodetic reference system may be used as a reference system to determine location of the one or more subjects. For example, the co-ordinates of each of the subject may be represented as Longitude and Latitude.

In an embodiment, the selection module 215 selects at least one video feed among the live video feed data 206 based on the correlation data 209 and at least one of one or more predefined parameters, personalized inputs and specification of each of the plurality of imaging units 102. The at least one video feed is received from at least one imaging unit among the plurality of imaging units 102, focussing the view zone within which the at least one subject is present. Thus, the selection of the at least one video feed enables generating personalized video feed for each user. In an embodiment, the one or more predefined parameters may include importance of incidents within the event, camera transition template, camera feed quality and camera selection priority, etc.

In an embodiment, the transmission module 217 transmits the at least one selected video feeds to a web server 104 for transmitting. The web server 104 may be configured by the transmission module 217 to transmit the at least one video feed to respective user among each of the user. Thereby, the view generator 101 provides personalized views of live video feed data 206 for each of the user.

In an embodiment, the specification of each of the plurality of imaging units 102 may include lens optics data, shutter speed, zoom ratio, tilt angle, focus, pan angle and identity number of the plurality of imaging units.

In an embodiment, the personalized views are ranked based on the one or more personalized inputs. The ranked personalized views are then transmitted to respective user among each user. In an embodiment, the highest ranked personalized view is provided as a default view to the user. However, the user can select any view among the ranked personalized views for viewing. Further, the view generator 101 can predict views for each user based on the user data.

Figure 3:
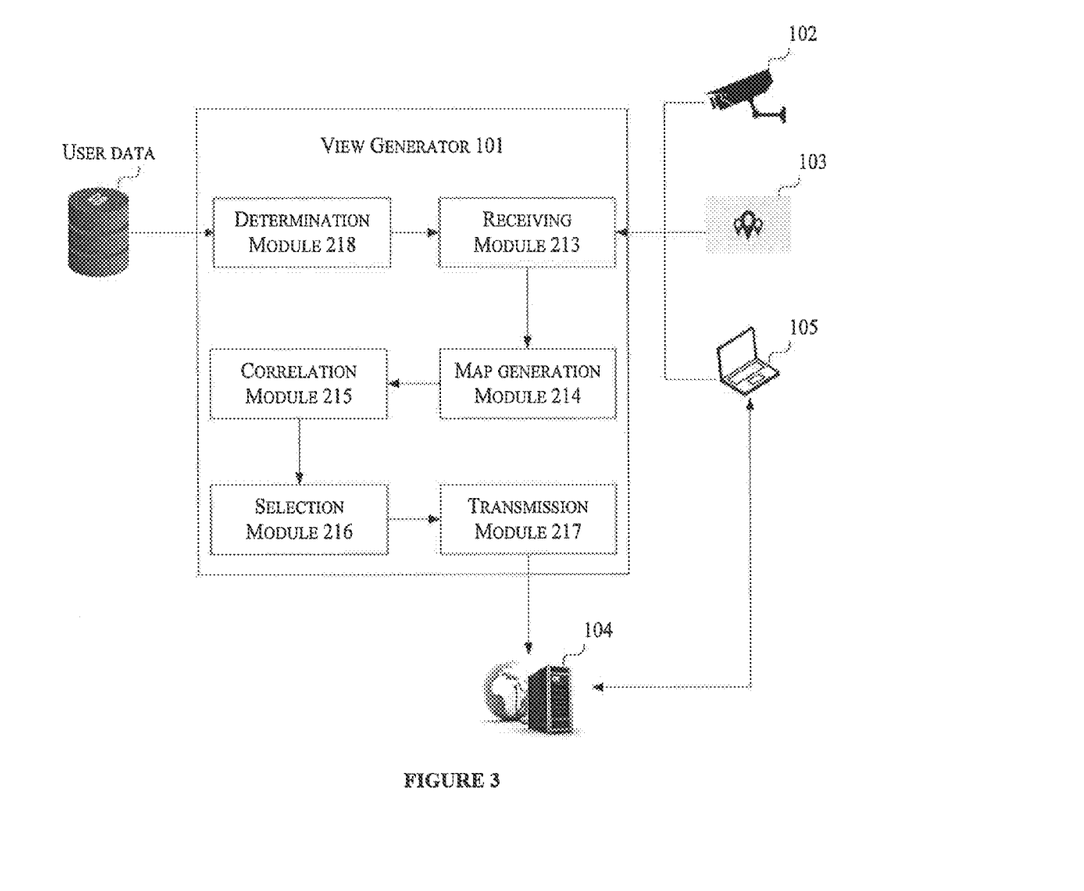
FIG. 3 of the present disclosure shows a system illustrating process flow for generating personalized views of live video feeds in accordance with some embodiments of the present disclosure.

FIG. 3 of the present disclosure shows a system illustrating process flow for generating personalized views of live video feeds.

Figure 4:
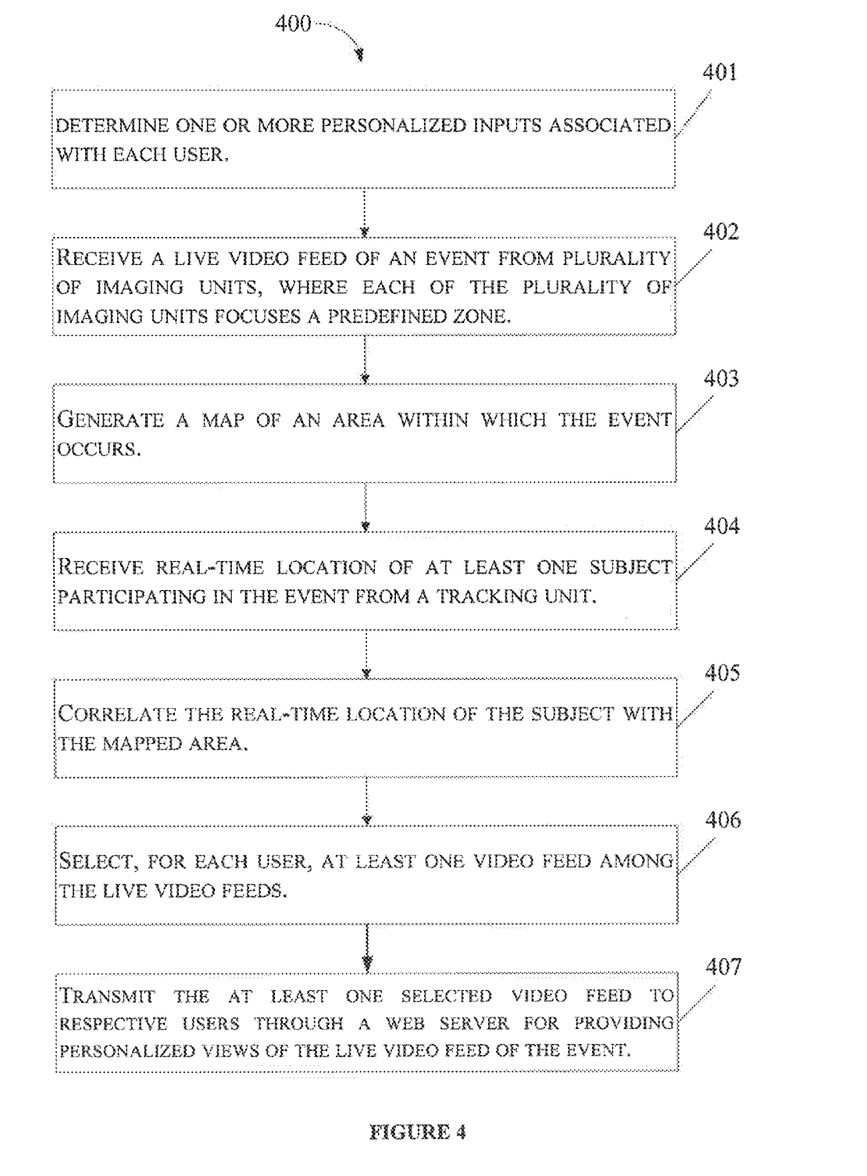
FIG. 4 of the present disclosure shows an exemplary flow chart illustrating a method for generating personalized views of live video feeds of an event with some embodiments of the present disclosure.

FIG. 4 shows a flowchart illustrating a method for generating personalized views of live video feeds of an event in accordance with some embodiments of the present disclosure.

As illustrated in FIG. 4, the method 400 may comprise one or more steps for generating personalized views of live video feeds. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 401, determining one or more personalized inputs associated with each user by the determination module 217. Here, the determination module 217 of the view generator 101 determines the one or more personalized inputs based on user data. The user data may include historical viewing pattern of each of the user.

In an embodiment, the view generator 101 may receive the one or more personalized inputs associated with each user from one or more user devices 105. Each user provides personalized inputs through the one or more user device s 105. The one or more personalized user inputs comprise at least one of the at least one subject, predefined viewing angles of the event and importance of an incident of the event.

At step 402, receiving, by the receiving module 212, live video feed data 206 of an event from plurality of imaging units 102 associated with the view generator 101. Each of the plurality of imaging units 102 focuses a view zone. The view zone provides specification for identifying the areas covered by the plurality of imaging units 102. Then, each of the plurality of imaging units 102 captures live video feed of the view zone. The receiving module 212 receives the captured live video feed data 206 from each of the imaging units 102.

At step 403, generating, by the map generation module 213, a map of an area within which the event occurs. The map generation module 213 generates the map of the area based on the view zone focussed by each of the plurality of imaging units 102. The map generation module 213 aggregates each of the view zones of each of the plurality of imaging units 213 to generate the map of the area. The generated map of the area is represented by co-ordinates. The map indicates a boundary within which the event occurs.

At step 404, receiving by the receiving module 212, real-time location of at least one subject. The receiving module 212 receives the real-time location of the at least subject from a tracking unit 103 based on the personalized inputs. In an embodiment, the tracking unit 103 tracks each of the one or more subjects participating in the event.

At step 405, correlating by the correlation module 214 mapped area with the real-time location of the at least one subject. The correlation indicates presence of the at least one subject in the mapped area. The correlation data comprises co-ordinates of the at least one subject with the mapped area as reference.

At step 406, selecting, by the selection module 215, at least one video feed from the live video feed data 206 based on the correlation and at least one of the one or more predefined parameters, one or more personalized inputs and specification of each of the plurality of imaging units 102. The selection module 215 transcodes, segments, packs and encrypts the at least one selected video feed. In an embodiment, the selection module 215 can suggest alternative views to each user based on the user data.

At step 407, transmitting, by the transmission module 216, the at least one selected video feed to a web server 104 for transmitting. Here, the transmission module 216 receives the at least one selected video feed from the selection module 215 and transmits to the web server 104 associated with the view generator 101. Further, the processor 203 of the view generator 101 can configure the web server 104 to transmit the at least one video to respective user among each user, thereby providing personalized views of the live video feeds to each user.

In an embodiment, the web server 104 can be configured to transmit the at least one video feed over Internet services. In an alternative embodiment, the at least one video feed can be transmitted over Direct To Home (DTH) services.

In an embodiment, the view generator 101 may identify key sections in the mapped area. Further, view generator 101 may also identify key incidents of the event based on the user data and one or more personalized inputs. Then, the view generator 101 may select at least one view of the live video feeds streaming the key sections and key incidents for the user to view.

For example, consider an event, for illustration, a sport event hosting two teams Team A and Team B respectively. Let each team comprise five players. Consider ten imaging units 102 installed providing ten different views of the event. Each of the ten imaging units 102 provide specification for identifying the areas covered by them. Also, consider a tracking unit 103 associated with the view generator 101 to track each of the ten players.

Iterating the method steps of the present disclosure, the determination module 217 determines one or more personalized inputs comprising the following data: player 4 of Team A, view 7, climax of the sport event. Further, the receiving module 212 receives the live feeds from each of the ten imaging units 102. Then, the map generation module 213 generates a map of the area in which the sport event occurs based on the view zone focussed by each of the ten imaging units 102. Further, the receiving unit 212 receives real-time location of player 4 of Team A from the tracking unit 103. Then, the correlation module 214 correlates the location of player 4 of team A with the map generated. The correlation indicates whether the player 4 is present within the mapped area or outside the mapped area. Then, the selection module 215 selects at least one video feed from the live video feeds focussing the player 4 of Team A. Also, the view 7 is selected by the selection unit 215 based on the personalized inputs. Furthermore, at least one imaging unit 102 focusing climax of the sport event is selected. The selected video feeds are then ranked based on the personalized inputs and the one or more parameters. Lastly, the transmission module 216 transmits the at least one selected video feed to the web server 104 for transmitting. Here, the view generator 101 configures the web server 104 to transmit the at least one selected video feed to respective user among each user, thereby generating personalized views.

The processor 203 of the view generator 101 may be used to configure the working of each of the modules 210 of the view generator 101. Further, the processor 203 may be used to integrate the working of each of the modules 210.

COMPUTER SYSTEM

Figure 5:
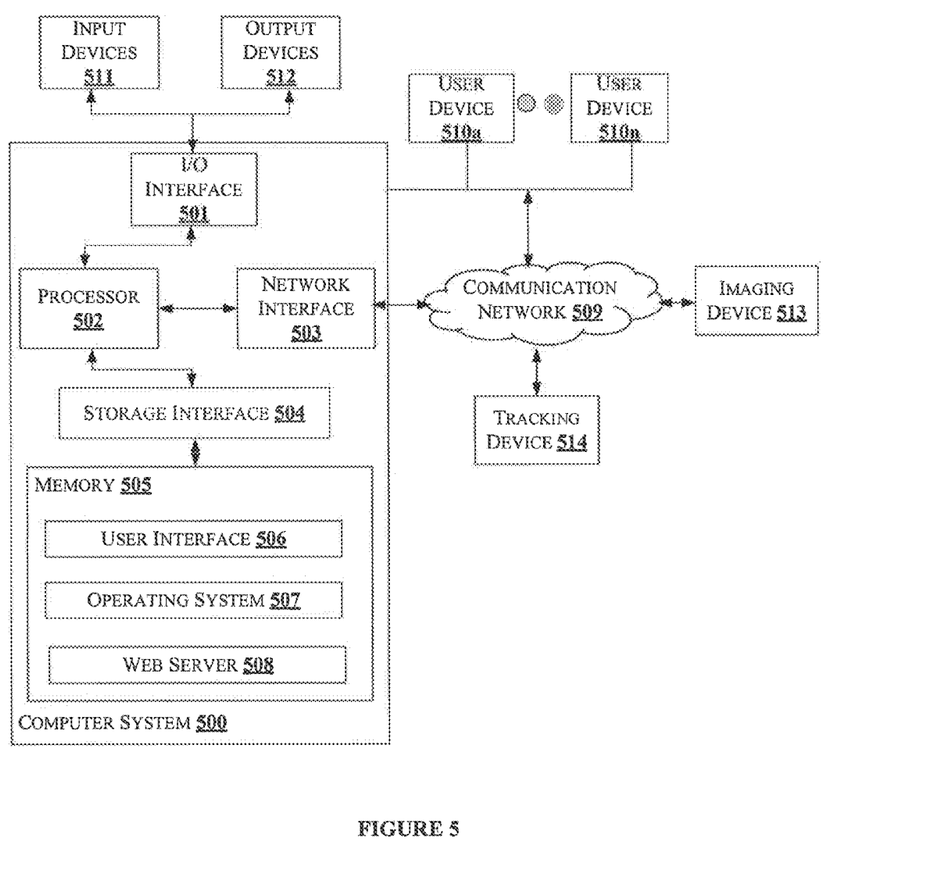
FIG. 5 is a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the method for generating personalized views of live video feeds of an event. The computer system 500 may comprise a central processing unit ("CPU" or "processor") 502. The processor 502 may comprise at least one data processor for executing program components for dynamic resource allocation at run time. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 511 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 512 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 is connected to the service operator through a communication network 509. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 509 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 503 and the communication network 509, the computer system 500 may communicate with the one or more service operators.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web server 508 etc. In some embodiments, computer system 500 may store user/application data 506, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, 10 etc.), Apple iOS, Google Android, Blackberry OS, or the like.

In some embodiments, the computer system 500 may implement a web browser 507 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the present disclosure discloses a method and a system for generating personalized views of live video feeds of an event. Thus, the method and system enhances viewing experience of each user.

In an embodiment, the present disclosure relays live telecast of the event according to personalized inputs. Thereby, the present system provides personalized views without delays caused during post processing.

In an embodiment, the present disclosure suggests alternate views and predicts views based on historical viewing pattern of a user.

In an embodiment, the proposed system is cost effective and can be integrated with existing system architecture.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS:

| Reference number | Description |
| --- | --- |
| 100 | System |
| 101 | View generator |
| 102 | Imaging unit |
| 103 | Tracking unit |
| 104 | Web server |
| 105 | User devices |
| 201 | I/O Interface |
| 202 | Memory |
| 203 | Processor |
| 204 | Data |
| 205 | Personalized input data |
| 206 | Live video feed data |
| 207 | Location data |
| 208 | Map data |
| 209 | Correlation data |
| 210 | Other data |
| 211 | Modules |
| 212 | Receiving module |
| 213 | Map generation module |
| 214 | Correlation module |
| 215 | Selection module |
| 216 | Transmission module |
| 217 | Determination module |
| 218 | Other modules |
| 500 | General computer system |
| 501 | I/O Interface |
| 502 | Processor |
| 503 | Network Interface |
| 504 | Storage Interface |
| 505 | Memory |
| 506 | User Interface |
| 507 | Operating System |
| 508 | Web Server |
| 509 | Communication Network |
| 510 | User device |
| 511 | Input Device |
| 512 | Output Device |
| 513 | Imaging device |
| 514 | Tracking device |

What is claimed is:

1. A method for generating personalized views of live video feeds of an event, comprising:
   determining, by a view generator, one or more personalized inputs associated with each user based on user data;
   receiving, by the view generator, a live video feed of an event from each of a plurality of imaging units associated with the view generator, wherein each of the plurality of imaging units focuses a view zone;
   generating, by the view generator, a map of an area within which the event occurs, based on the view zone focussed by each of the plurality of imaging units;
   receiving, by the view generator, real-time location of at least one subject participating in the event from a tracking unit associated with the view generator;
   correlating, by the view generator, the real-time location of the subject with the mapped area;
   selecting, by the view generator, for each user, at least one video feed among the live video feeds based on the correlation and at least one of one or more predefined parameters, one or more personalized inputs and specification of each of the plurality of imaging units; and
   transmitting, by the view generator, the at least one selected video feed to respective users through a web server for providing personalized views of the live video feeds of the event.

2. The method of claim 1, wherein the real-time location comprises co-ordinates of the at least one subject.

3. The method of claim 1, wherein each of the plurality of imaging units is calibrated to focus the view zone, prior to occurrence of the event.

4. The method of claim 1, wherein the correlation indicates presence of the at least one subject in the area.

5. The method of claim 1, wherein the one or more personalized inputs comprises at least one of predefined viewing angles of the event, at least one subject, group affiliation and preferred types of incidents within the event.

6. The method of claim 1, further comprising receiving specification of each of the plurality of imaging units, wherein the specification comprises at least one of lens optics data, shutter speed, zoom ratio, tilt angle, focus, pan angle and identity number of the plurality of imaging units.

7. The method of in claim 1, wherein the one or more predefined parameters comprises at least one of importance of incidents within the event, camera transition template, camera feed quality and camera selection priority.

8. The method of claim 1, wherein the personalized views are ranked based on the one or more personalized user inputs, wherein the user selects at least one view among the personalized views of the live video feeds based on the ranking.

9. A view generator for generating personalized views of live video feeds of an event, comprising:
   a processor: and
   a memory, communicatively coupled to the processor, wherein, the memory stores processor executable instructions, which, on execution causes the processor to:
      determine one or more personalized inputs associated with each user based on user data;
      receive a live video feed of an event from each of a plurality of imaging units associated with the view generator, wherein each of the plurality of imaging units are focuses a view zone;
      generate a map of an area within which the event occurs, based on the view zone focussed by each of the plurality of imaging units;
      receive real-time location of at least one subject participating in the event from a tracking unit associated with the view generator;
      correlate the real-time location of the subject with the mapped area;
      select for each user, at least one video feed among the live video feeds based on the correlation and at least one of one or more predefined parameters, one or more personalized inputs and specification of each of the plurality of imaging units; and
      transmit the at least one selected video feed to respective users through a web server for providing personalized views of the live video feeds of the event.

10. The view generator of claim 9, wherein the real-time location comprises co-ordinates of the at least one subject.

11. The view generator of claim 9, wherein each of the plurality of imaging units is calibrated to focus the view zone, prior to occurrence of the event.

12. The view generator of claim 9, wherein the correlation indicates presence of the at least one subject in the area.

13. The view generator of claim 9, wherein the one or more personalized inputs comprises at least one of predefined viewing angles of the event, the at least one subject, group affiliation and preferred types of incidents within the event.

14. The view generator of claim 9, further comprising receiving specification of each of the plurality of imaging units, wherein the specification comprises at least one of lens optics data, shutter speed, zoom ratio, tilt angle, focus, pan angle and identity number of the plurality of imaging units.

15. The view generator of claim 9, wherein the one or more predefined parameters comprises at least one of importance of incidents within the event, camera transition template, camera feed quality and camera selection priority.

16. The view generator of claim 9, wherein the personalized views are ranked based on the one or more personalized user inputs, wherein the user selects at least one view among the personalized views of the live video feeds based on the ranking.

17. A non-transitory computer readable medium including instructions stored thereon that when processed by at least one processor cause a device to perform operations comprising:
   determining one or more personalized inputs associated with each user based on user data;
   receiving a live video feed of an event from each of a plurality of imaging units associated with the view generator, wherein each of the plurality of imaging units focuses a view zone;
   generating a map of an area within which the event occurs, based on the view zone focussed by each of the plurality of imaging units;
   receiving real-time location of at least one subject participating in the event from a tracking unit associated with the view generator;
   correlating the real-time location of the subject with the mapped area;
   selecting for each user, at least one video feed among the live video feeds based on the correlation and at least one of one or more predefined parameters, one or more personalized inputs and specification of each of the plurality of imaging units; and
   transmitting the at least one selected video feed to respective users a through a web server for providing personalized views of the live video feeds of the event.

* * * * *

UNITED STATES PATENT AND TRADEMARK OFFICE
CERTIFICATE OF CORRECTION

PATENT NO. : 9,935,992 B2
APPLICATION NO. : 15/085176
DATED : April 3, 2018
INVENTOR(S) : Harish Nair Rajagopal et al.

Page 1 of 1

It is certified that error appears in the above-identified patent and that said Letters Patent is hereby corrected as shown below:

In the Claims

Claim 1, Column 12, Line 51, "focussed" should read as --focused--.

Claim 2, Column 12, Line 67, "co-ordinates" should read as --coordinates--.

Claim 9, Column 13, Line 39, "focussed" should read as --focused--.

Claim 10, Column 14, Line 2, "co-ordinates" should read as --coordinates--.

Claim 17, Column 14, Line 38, "focussed" should read as --focused--.

Signed and Sealed this
Twenty-sixth Day of June, 2018

Andrei Iancu
*Director of the United States Patent and Trademark Office*